US007827420B2

(12) United States Patent
Wong et al.

(10) Patent No.: US 7,827,420 B2
(45) Date of Patent: Nov. 2, 2010

(54) PORTABLE DEVICE WITH AN AUTOMATIC POWER OFF PROTECTION AND METHOD FOR SAME

(75) Inventors: Shih-Fang Wong, Taipei Hsien (TW); Tsung-Jen Chuang, Taipei Hsien (TW); Jian-Lin Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 847 days.

(21) Appl. No.: 11/736,590

(22) Filed: Apr. 18, 2007

(65) Prior Publication Data
US 2007/0250732 A1    Oct. 25, 2007

(30) Foreign Application Priority Data
Apr. 19, 2006    (CN)    ........................ 2006 1 0060403

(51) Int. Cl.
*G06F 1/00*    (2006.01)
(52) U.S. Cl. ........................... 713/300; 360/75; 714/24; 714/100
(58) Field of Classification Search .................. 713/300; 360/75; 714/24, 100
See application file for complete search history.

(56) References Cited

U.S. PATENT DOCUMENTS

| | | | | |
|---|---|---|---|---|
| 5,227,929 A * | 7/1993 | Comerford | .................... | 360/75 |
| 5,835,298 A * | 11/1998 | Edgerton et al. | .............. | 360/75 |
| 5,982,573 A * | 11/1999 | Henze | .......................... | 360/75 |
| 6,186,400 B1 * | 2/2001 | Dvorkis et al. | ......... | 235/462.45 |
| 6,498,719 B1 * | 12/2002 | Bridges | ................. | 361/679.34 |
| 6,738,214 B2 * | 5/2004 | Ishiyama et al. | .............. | 360/75 |
| 7,180,425 B2 * | 2/2007 | Yuasa | .......................... | 340/669 |
| 7,318,170 B2 * | 1/2008 | Makela et al. | ................. | 714/22 |
| 7,321,532 B2 * | 1/2008 | Chen | ....................... | 369/53.18 |
| 7,369,345 B1 * | 5/2008 | Li et al. | ........................ | 360/75 |
| 7,388,516 B2 * | 6/2008 | Yokota et al. | ............... | 340/933 |
| 7,430,452 B2 * | 9/2008 | Cromer et al. | ................ | 700/79 |
| 7,450,332 B2 * | 11/2008 | Pasolini et al. | ................ | 360/75 |

(Continued)

FOREIGN PATENT DOCUMENTS

EP    1612565 A2    1/2006

(Continued)

*Primary Examiner*—Thomas Lee
*Assistant Examiner*—Jaweed A Abbaszadeh
(74) *Attorney, Agent, or Firm*—Frank R. Niranjan

(57) ABSTRACT

A portable device with an automatic power off protection and a method of achieving such a protection are related. The portable device circuit comprises a switch unit, a main body, and a battery. The main body includes an acceleration transducer that samples an analog acceleration signal; an analog-to-digital converter (ADC) that converts the sampled analog acceleration signal into a digital acceleration value; a memory that stores a critical acceleration value and an interrupt flag; and a micro-control unit (MCU) that compares the digital acceleration values with the critical acceleration value and the comparing result which may or may not change the value of the interrupt flag. When the acceleration of the portable device is greater than the critical acceleration and the interrupt flag is enable, the MCU sends a break signal to the switch unit to power off the portable device.

8 Claims, 2 Drawing Sheets

U.S. PATENT DOCUMENTS

| | | | |
|---|---|---|---|
| 7,496,470 B2 * | 2/2009 | Nakamura et al. | 702/141 |
| 7,525,751 B2 * | 4/2009 | Han et al. | 360/75 |
| 7,541,551 B2 * | 6/2009 | Wehrenberg | 200/61.45 R |
| 7,549,335 B2 * | 6/2009 | Inoue et al. | 73/510 |
| 7,650,439 B2 * | 1/2010 | Chiu | 710/14 |
| 2003/0128475 A1 * | 7/2003 | Wehrenberg | 360/250 |
| 2004/0252397 A1 | 12/2004 | Hodge et al. | |
| 2005/0073764 A1 * | 4/2005 | Ogawa et al. | 360/60 |
| 2005/0264914 A1 * | 12/2005 | Kusumoto | 360/75 |
| 2005/0279165 A1 * | 12/2005 | Yuasa | 73/489 |
| 2006/0010340 A1 * | 1/2006 | Makela et al. | 714/5 |
| 2006/0044977 A1 * | 3/2006 | Chen | 369/53.17 |
| 2006/0070439 A1 * | 4/2006 | Kwon et al. | 73/488 |
| 2006/0136168 A1 * | 6/2006 | Nakamura et al. | 702/141 |
| 2006/0152842 A1 * | 7/2006 | Pasolini et al. | 360/75 |
| 2006/0215299 A1 * | 9/2006 | Kao et al. | 360/69 |
| 2006/0236761 A1 * | 10/2006 | Inoue et al. | 73/510 |
| 2006/0261978 A1 * | 11/2006 | Yokota et al. | 340/933 |
| 2007/0008162 A1 * | 1/2007 | Gossett et al. | 340/680 |
| 2007/0057068 A1 * | 3/2007 | Tsai | 235/472.01 |
| 2007/0107068 A1 * | 5/2007 | Kelley et al. | 726/34 |

FOREIGN PATENT DOCUMENTS

JP    9-107327 A    4/1997

\* cited by examiner

PORTABLE DEVICE WITH AN AUTOMATIC POWER OFF PROTECTION AND METHOD FOR SAME

BACKGROUND

1. Technical Field

The present invention relates to a portable device, particularly to a portable device with an automatic power off protection circuitry as well as a method of achieving such automatic power off protection on the portable device.

2. Related Art

Portable devices, such as mobile phones and media players, are becoming smaller in size while being packed with more functions. This leads to manufacturers, of the portable devices, having to densely packed integrated circuits in close proximity to each other. As such, a need exist to protect these integrated circuits since electrical circuits in close proximity to each other are easily damaged or may exhibit erroneous behavior when subjected to adverse conditions. Indeed, when a portable device drops, not only are they superficial damages to the portable device but the underlying electrical circuits of the portable device may also be damaged.

The US patent publication US20040252397 ('397), entitled "A Media Player With Acceleration Protection", published on Dec. 12, 2004, discloses a hard drive protective technology and the method thereof. The '397 patent discloses that: By monitoring the acceleration, i.e., sudden or abrupt changes in position, of the media player, the media player can "alter an operation" of the hard drive when this acceleration exceeds a critical acceleration value. Thus, if the media player experiences a sudden acceleration, such as being accidentally dropped, the media player "parks" the hard drive and damages and/or data loss can be reduced if or when the media player collides with the ground.

However, the above invention is only applicable to devices with hard drives. For portable devices without hard drivers the need to protect critical circuitry during collision with other objects is also a concern. However, portable devices are subjected to less damage in a power off state than in a power on state.

Accordingly, it would be advantageous to provide a portable device, with or without hard drives, with a power off protection circuitry when the portable device experiences a sudden change in position. The power off protection circuitry of the portable device should be capable of automatically shutting down the portable device when the portable device experiences a sudden acceleration that is greater than a critical acceleration.

SUMMARY

In view of the foregoing disadvantages inherent in the known media player present in the prior art, the present invention provides a portable device make up the shortcomings of the media player.

The present invention provides a portable device with a power off protection circuit, comprising a switch unit, a main body, and a battery. The battery is used to power the main body via the switch unit. The main body includes an acceleration transducer that samples an analog acceleration signal; an analog-to-digital converter (ADC) that converts the analog acceleration signal into a digital acceleration value; a memory that stores a critical acceleration value and an interrupt flag; and a micro-control unit (MCU) that compares the digital acceleration values with the critical acceleration value and the comparing result which may or may not change the value of the interrupt flag. When the portable device acceleration is greater than the critical acceleration the power off protection circuitry sets the interrupt flag to enable. The portable device acceleration is again sampled and compared with the critical acceleration in order to avoid false acceleration readings. Thus, if the second comparison confirms that the portable device is experiencing a continuous acceleration, the MCU sends a break signal to the switch unit to power off the portable device.

The present invention also provides a method for protecting the portable device from being damaged by powering off the device when it is greater than a critical acceleration. The portable device has a memory for storing a critical acceleration value and an interrupt flag for recording an acceleration state of the portable device, the method comprising the steps of: sampling an analog acceleration signal of the portable device; converting the analog acceleration signal into a digital acceleration value; comparing the digital acceleration value with the critical acceleration value and producing a comparing result; and powering on or powering off the portable device according to the comparing result and the interrupt flag One object of the present invention is to provide a power off protection for different portable devices. The other object is to reduce damage to the portable device by powering off therein.

DETAILED DESCRIPTION OF THE EMBODIMENTS

The present invention provides a portable device with an automatic power off protection function to power off the portable device when the acceleration of the device exceeds a critical accelerations. As mentioned before, damage to the portable device caused by the impact of the portable device colliding with the ground or other objects is less in a power off state than in a power on state. The portable device may be a cell phone, a laptop, a media player, a watch, a flashlight, a communication device, and the like. The portable device includes various modules for performing corresponding function and features, however for simplicity, in the following preferred embodiment only the modules related to powering off the portable device automatically are described.

Figure 1:
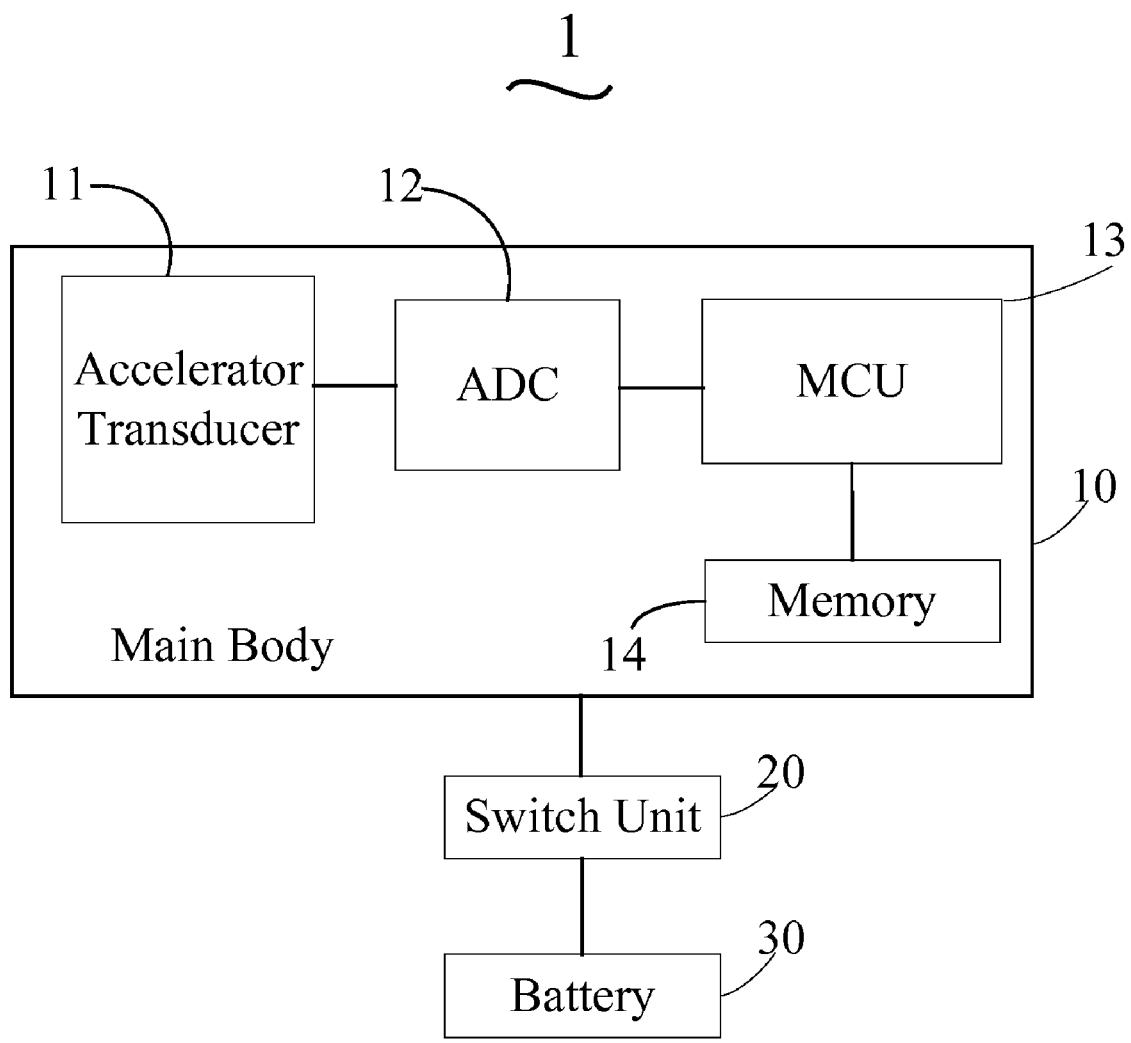
FIG. 1 is a block diagram of a portable device in accordance with a preferred embodiment of the present invention.

FIG. 1 is a block diagram of a portable device 1 in accordance with a preferred embodiment of the present invention. The portable device 1 includes a main body 10, a switch unit 20, and a battery 30. These aforementioned elements form a circuit. The battery 30 powers the main body 10 via the switch unit 20. The main body 10 includes an acceleration transducer 11, an analog-to-digital converter (ADC) 12, a micro-controller unit (MCU) 13, and a memory 14. When the portable device 1 exceeds the critical acceleration, the switch unit 20 cuts off the circuit between the battery 30 and the main body 10.

The acceleration transducer 11 is used to sample a real-time analog acceleration signal of the portable device 1. The ADC 12 converts the analog acceleration signal into a digital acceleration value.

The memory 14, connected to the MCU 13, stores a critical acceleration value and an interrupt flag. The critical acceleration value represents the maximum acceleration that the portable device can be subjected to before causing damage to electrical circuits of the portable device. The critical acceleration value can be set according to a laboratory test result values deduced by repeated dropping and collision, or can be set to the average value of the acceleration due to gravity. A value of the interrupt flag is either of an enable value or a disable value. In the preferred embodiment, the bit "1" represents the enable value, and a bit "0" represents the disable value. Once the portable device 1 is powered on, the initial value of the interrupt flag is set to "0" thus the interrupt flag stores a disable value.

The MCU 13 compares the digital acceleration value with the critical acceleration value and produces a comparing result that may or may not change the value of the interrupt flag. The MCU 13 further determines whether to power off the portable device according to the comparing result and the value of the interrupt flag. If the digital acceleration value is greater than the critical acceleration value and the value of the interrupt flag is "0", the value of the interrupt flag is set to "1". If the digital acceleration value is less than the critical acceleration value and the value of the interrupt flag is "0", not to change the value of the interrupt flag. If the digital acceleration value is less than the critical acceleration value and the value of the interrupt flag is "1", the value of the interrupt flag is set to "0" and the MCU 13 continues doing the next comparison. However, if the digital acceleration value is greater than the critical acceleration value and the value of the interrupt flag is "1", the value of the interrupt flag is set to "0". At the same time, the MCU 13 generates a break signal and sends the break signal to the switch unit 20. After receiving the break signal the switch 20 power off the device.

By checking the enabled state of the interrupt flag twice, the power off protection circuitry avoids false acceleration readings. False acceleration readings can be manifested by short sudden acceleration such as when a person is jumping, swinging, or shaking their arms when holding the portable device. The power off protection circuitry is able to sample and compare the acceleration of the portable device with the critical acceleration two times when the portable device has an acceleration of one gravity (g) and within a distance of one meter. The comparison is done twice to avoid possible erroneous powering off of the device. Additionally this comparison must be done within one meter because one meter (or less) is the height that most falling portable devices will sustain superficial damages only. If the portable device falls from a distance greater than one meter the portable device electronic circuitries may be harmed.

The switch unit 20 is in a close state when the portable device 1 is powered on, thus the circuit of the battery 30 and the main body 10 is connected. The switch unit 20 stays in the close state until it receives the break signal from the MCU 13. After receiving the break signal, the switch unit 20 changes to an open state such that the circuit of the battery 30 and the main body 10 is disconnected.

Figure 2:
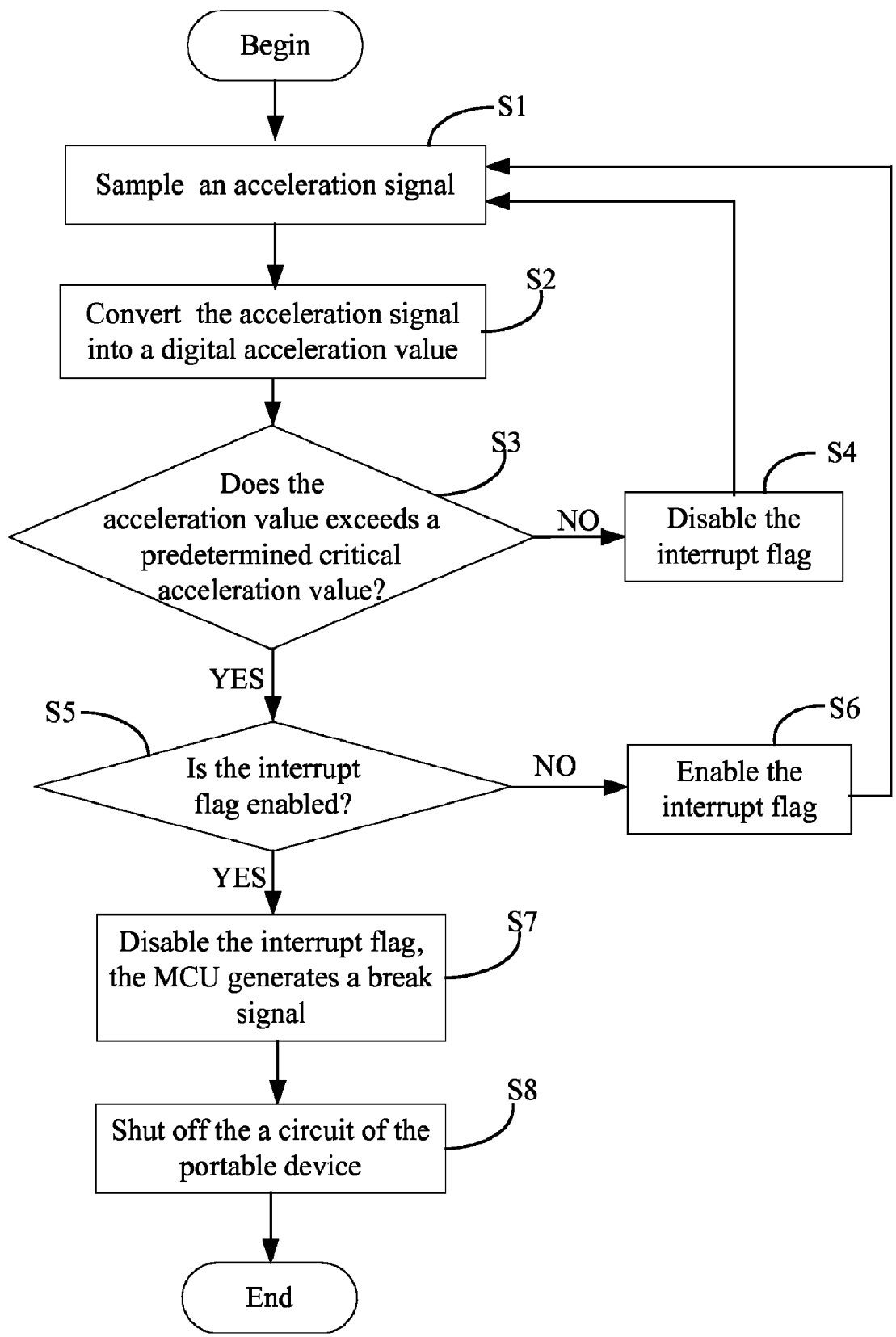
FIG. 2 describes a flowchart of a preferred procedure for presenting an operation process according to the present invention.

FIG. 2 is a flow chart illustrating a preferred procedure for presenting an operation process according to the present invention. The flowchart will be explained with reference to FIG. 1.

When the portable device is powered on, in step S1, the acceleration transducer 11 samples any analog acceleration signal of the portable device 1.

In step S2, the ADC 12 converts the analog acceleration signal into a digital acceleration value.

In step S3, the MCU 13 compares the digital acceleration value with the predetermined critical acceleration value stored in the memory 14. The procedure goes to step S4 if the digital acceleration value is less than the critical acceleration value, or goes to step S5 if the digital acceleration value is greater than the critical acceleration value.

If the digital acceleration value is less than the critical acceleration value, the MCU 13 sets the value of the interrupt flag "0" in step S4, and the procedure goes to step S1.

If the digital acceleration value is greater than the critical acceleration value, the procedure goes to step S5. The MCU 13 queries the value of the interrupt flag in step S5. If the value of the interrupt flag is "0", the procedure goes to step S6. If the value of the interrupt flag is "1", the procedure goes to step S7.

If the value of the interrupt flag is "0", the MCU 13 sets the value of the interrupt flag "1" in step S6, and the procedure goes to step S1.

If the value of the interrupt flag is "1", the MCU 13 sets the value of the interrupt flag "0" again in step S7, at the same time, the MCU 13 sends a break signal to the switch unit 20. Then the procedure goes to step S8.

In step S8, the switch unit 20 disconnects the circuit of the battery 30 and the main body 10 in response to the break signal, and the portable device 1 powers off.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A portable device with an automatic power off protection circuit, comprising a switch unit, a main body, and a battery; the battery powers the main body via the switch unit; wherein:
   the main body comprises:
   an acceleration transducer for sampling an analog acceleration signal;
   an analog-to-digital converter (ADC) for converting the analog acceleration signal into a digital acceleration value;
   a memory for storing a critical acceleration value and an interrupt flag, a value of the interrupt flag being either of an enable value or a disable value, and an initial value of the state of the interrupt flag being set to the disable value when the portable device is powered on; and
   a micro-control unit (MCU) for comparing the digital acceleration value with the critical acceleration value and the comparing result that may or may not change the value of the interrupt flag;
   wherein if the digital acceleration value is greater than the critical acceleration value, and the value of the interrupt flag is the disabled value, the MCU changes the value of the interrupt flag to the enable value, and if the digital acceleration value is greater than the critical acceleration value, and the value of the interrupt flag is the enabled value, the MCU generates a break signal and sends the break signal to the switch unit to power off the portable device.

2. The portable device according to claim 1, wherein if the digital acceleration value is less than the critical acceleration value, and the value of the interrupt flag is the disabled value, the MCU does not change the value of the interrupt flag.

3. The portable device according to claim 2, wherein if the digital acceleration value is less than the critical acceleration value and the value of the interrupt flag is the enabled value, the MCU changes the value of the interrupt flag to the disable value.

4. The portable device according to claim 3, wherein if the digital acceleration value is greater than the critical acceleration value and the value of the interrupt flag is the enabled value, the MCU sets the value of the interrupt flag to the disable value.

5. An automatically power off method for a portable device, wherein the portable device has a memory for storing a critical acceleration value and an interrupt flag for recording an acceleration state of the portable device, a value of the interrupt flag being either of an enable value or a disable value, and an initial value of the state of the interrupt flag being set to the disable value when the portable device is powered on, the method comprising the steps of:

sampling an analog acceleration signal of the portable device;

converting the analog acceleration signal into a digital acceleration value;

comparing the digital acceleration value with the critical acceleration value;

changing the value of the interrupt flag to the enabled value if the digital acceleration value is greater than the critical acceleration vale and the value of the interrupt flag is the disabled value; and sending a break signal to power off the portable device if the digital acceleration value is greater than the critical acceleration value and the value of the interrupt flag is the enabled value.

6. The automatically power off method according to claim 5, further comprising: not changing the value of the interrupt flag if the digital acceleration value is less than the critical acceleration value and the value of the interrupt flag is disabled value.

7. The automatically power off method according to claim 6, further comprising: changing the value of the interrupt flag to the disabled value if the digital acceleration value is less than the digital acceleration value and the value of the interrupt flag is the enabled value.

8. The automatically power off method according to claim 7, further comprising: changing the value of the interrupt flag to the disabled value if the digital acceleration value is greater than the critical acceleration value and the value of the interrupt flag is the enabled value.

* * * * *